United States Patent [19]

Gimmler et al.

[11] 4,437,551

[45] Mar. 20, 1984

[54] HYDRODYNAMIC TORQUE CONVERTER

[75] Inventors: Joachim Gimmler, Dittelbrunn; Bernd Schöder, Münnerstadt, both of Fed. Rep. of Germany

[73] Assignee: Fichtel & Sachs AG, Schweinfurt, Fed. Rep. of Germany

[21] Appl. No.: 285,985

[22] Filed: Jul. 23, 1981

[30] Foreign Application Priority Data

Aug. 7, 1980 [DE] Fed. Rep. of Germany ....... 3029860

[51] Int. Cl.³ ............................................ F16H 45/02
[52] U.S. Cl. .................................................. 192/3.28
[58] Field of Search .................... 192/3.28, 3.29, 3.31, 192/3.3, 70.27, 106.1, 106.2, 70.17, 70.18

[56] References Cited

U.S. PATENT DOCUMENTS

| | | | |
|---|---|---|---|
| 3,239,037 | 3/1966 | Croswhite et al. | 192/3.33 X |
| 3,463,033 | 8/1969 | Fisher | 192/3.3 |
| 3,497,043 | 2/1970 | Leonard | 192/3.3 X |
| 4,138,003 | 2/1979 | Malloy | 192/3.29 |
| 4,143,561 | 3/1979 | Melhorn | 192/106.2 X |
| 4,240,532 | 12/1980 | Blomquist | 192/3.28 |
| 4,274,519 | 6/1981 | Moroto et al. | 192/3.28 |
| 4,289,048 | 9/1981 | Mikel et al. | 192/3.29 |
| 4,289,220 | 9/1981 | Onuma et al. | 192/3.3 |
| 4,353,444 | 10/1982 | Bionaz | 192/3.29 |

FOREIGN PATENT DOCUMENTS

| | | |
|---|---|---|
| 2447 | 8/1978 | European Pat. Off. . |
| 2025 | 8/1978 | European Pat. Off. . |
| 2024 | 8/1978 | European Pat. Off. . |
| 1073010 | 6/1967 | United Kingdom . |
| 1530359 | 10/1978 | United Kingdom . |

Primary Examiner—George H. Krizmanich
Attorney, Agent, or Firm—Toren, McGeady and Stanger

[57] ABSTRACT

In a hydrodynamic torque converter a pump wheel, a turbine wheel and a guide wheel are enclosed within a converter housing. These three wheels interact in a fluid cycle and are rotatable relative to one another. A controllable bridging clutch is located between the pump wheel and the turbine wheel and is disposed parallel to the torque transmission path between the two wheels. The clutch couples the turbine wheel to the pump wheel without any slippage and in dependence on the pressure of the hydraulic fluid in the converter housing. In the path of the bridging clutch, springs of a torsional vibration damper are arranged for dampening irregularities in the torque transmission on both the driving side and the driven side. A friction damper is connected in parallel with the torsional vibrational damper. When the bridging clutch is closed, the friction damper dampens the vibrational amplitude of the torsional vibration damper and consequently the vibrational amplitude of the turbine wheel relative to the converter housing. When the bridging clutch is open, the friction damper fixes the parts of the torsional vibration damper which are movable with respect to one another so that noise generation in the torque converter is reduced when the bridging clutch is open or disengaged as well as when it is closed or engaged.

6 Claims, 2 Drawing Figures

4,437,551

HYDRODYNAMIC TORQUE CONVERTER

SUMMARY OF THE INVENTION

The present invention is directed to a hydrodynamic torque converter with a shiftable bridging clutch between the turbine wheel and the pump wheel.

Such a hydrodynamic torque converter is known, such as disclosed in report 780100 of the Society of Automotive Engineers. The bridging clutch is engaged depending on the fluid pressure in the torque converter and it prevents slippage between the turbine wheel and the pump wheel which slippage tends to reduce efficiency. To compensate for uneven fluctuations in rotational speeds which occur on the driven side or on the driving side, in the torque transmission path of the bridging clutch, springs of a torsional vibration damper are connected for improving the torque transmission behavior of the torque converter when the bridging clutch is engaged. Such a torque converter, however, forms a vibratory structure which can only be adjusted with great difficulty to the many possible sources of interference in the torque transmission path.

Therefore, it is the primary object of the present invention to provide an improved torque converter of the above-described type so that, while the bridging clutch is engaged, a non-vibrating torque transmission is assured and, in particular, operating noises which may occur because of such vibrations are reduced. Furthermore, the torque converter distinguishes itself by the long service life of the structural parts involved in torque transmission.

In accordance with the present invention, a friction damper is arranged in parallel with the torsion vibration spring damper. The friction damper affords a defined damping of the structural parts which are rotatable relative to one another against the effects of the torsional vibration spring damper. The friction damper reduces the vibrational amplitudes and thus permits a uniform torque transmission.

The invention can be used advantageously in torque converters in which the pump wheel is fixed to the converter housing. In such an arrangement, the bridging clutch includes a clutch disc positioned between the turbine wheel and an adjoining end face of the converter housing. This clutch disc can be pressed by a friction facing against the end face which forms a clutch countersurface. The torsional vibration spring damper permits a limited relative rotation between the turbine wheel and the clutch disc. When the bridging clutch is closed or engaged, however, there is no continuous slippage between the turbine wheel and the pump wheel. The clutch disc is mounted on the hub of the turbine wheel so that it is axially movable and can be placed in frictional engagement with the clutch countersurface by means of a driving mechanism. A separate driving mechanism may be employed to drive the clutch disc. Advantageously, the clutch disc is sealed with respect to its guiding structure so that it acts as a plunger which is axially adjusted in the converter housing in dependence on the fluid pressure. To follow the axial movement of the clutch disc, preferably the friction damper includes an axially elastic disc connected in its radial inner region with the turbine wheel or its hub, while its radially outer region rests on the clutch disc axially elastically prestressed by means of a friction facing. A friction damper of this type dampens vibration movements of the clutch disc independently of the state of the bridging clutch. Therefore, even when the clutch is disengaged, the friction damper reduces the noise of the clutch disc and the torsional vibration spring damper.

In a preferred embodiment, the outer region of the axially elastic disc is provided with a friction, facing or surface on both of its axially facing sides. An annular disc attaches one of the friction facings elastically to the clutch disc. This annular disc is preferably a cup spring which determines the contact pressure of the friction damper independently of any possible initial stress of the axially disc. Advantageously, the axially elastic disc is also constructed as a spring plate and is prestressed in such a way that it moves the clutch disc away from the clutch countersurface.

The springs of the torsional vibration spring damper, preferably constructed as helical springs, are held between stops which on one side project from the clutch disc and on the other side from the catch ring of the turbine wheel with the stops facing one another. The turbine blades on the turbine wheel have integral projections which extend through openings in a blade carrier shell of the turbine wheel and are caulked or soldered on the side facing away from the turbine blades. Preferably, part of the projections is also utilized for attaching the catch ring to the blade carrier bushing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
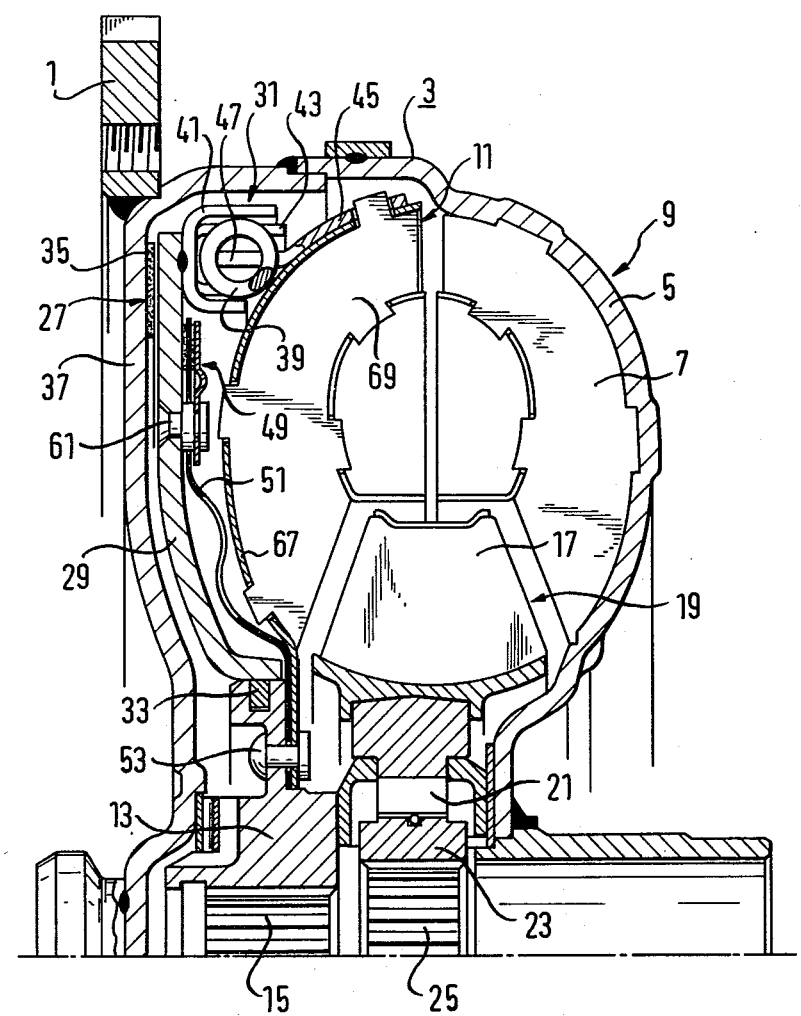
FIG. 1 is an axially extending cross-section through the upper half of a hydrodynamic torque converter.
Figure 2:
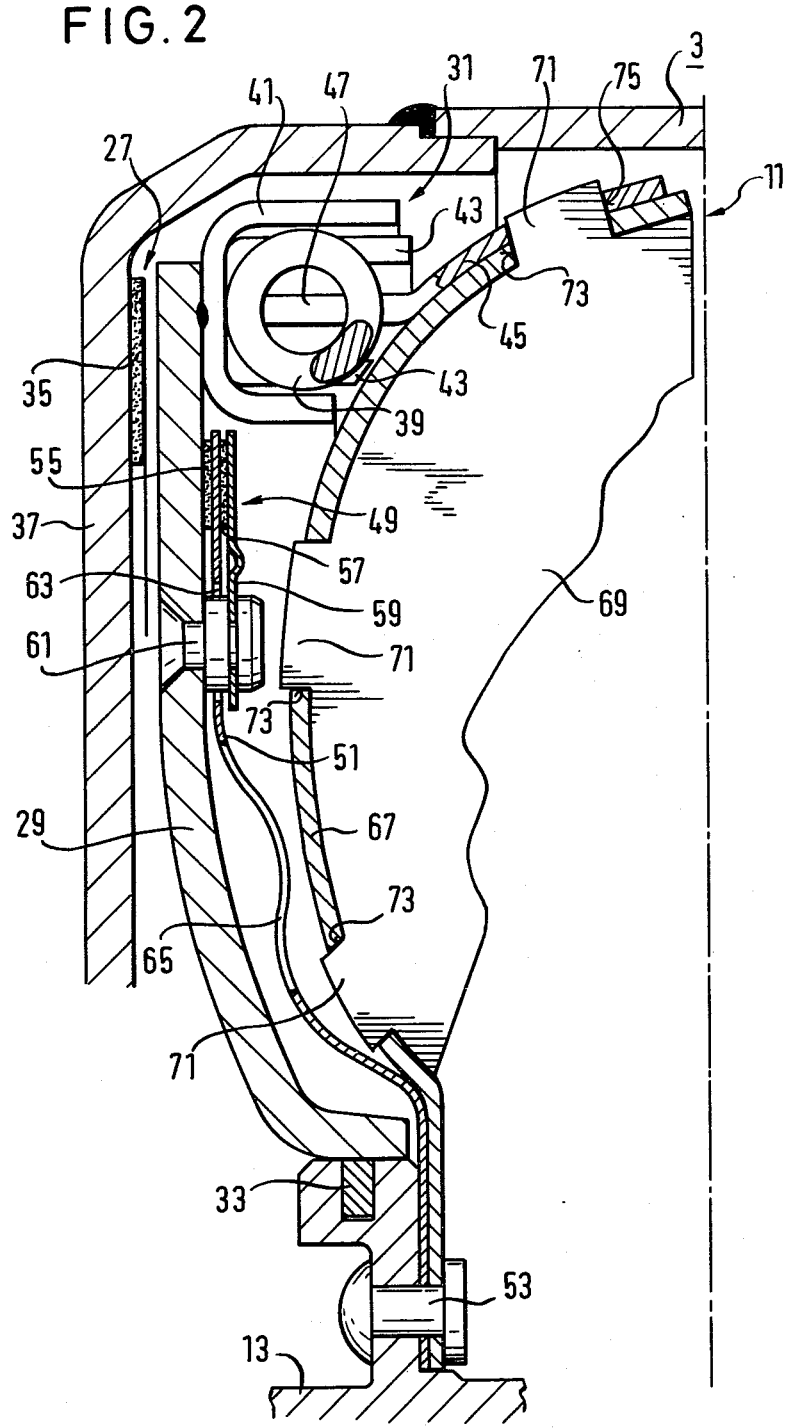
FIG. 2 is an enlarged cross-section of a part of the torque converter illustrated in FIG. 1.

In the drawing the torque converter includes a toroidal converter housing 3 coupled by means of a flange 1 to a crankshaft of an internal combustion engine, not shown. One of the axial end faces 5 of the converter housing 3 acts as a blade carrier shell for the blades 7 of a pump wheel 9 fixed to the converter housing. The converter housing also encloses a turbine wheel 11 whose hub 13 is fixed for rotation by means of an internal gear arrangement 15 with a shaft, not shown, such as the input shaft of a transmission. Guide blades 17 of a guide wheel 19 fit between the pump wheel 9 and the turbine wheel 11. Guide wheel 19 is supported in a conventional manner on a hub 23 by means of freewheeling device 21 which permits rotation in one direction only. The hub 23 is supported for rotation by a gear arrangement 25 on an intermediate tube, not shown.

During operation, the converter housing 3 and consequently the pump wheel 9 are driven and generate a circulation of fluid in the converter housing 3 which rotates the turbine wheel 11. During the differences in rotational speed at the beginning, the "support" of the fluid flow effects an increase in torque at the guide wheel 19. When the rotational speeds are acting, then the torque converter acts as a hydraulic clutch with the pump wheel 9 coupled to the turbine wheel 11. The free-wheeling device 21 permits the previously fixed guide wheel 19 to rotate freely. As a result, a torque transmission path extends between the pump wheel 9 and the turbine wheel 11.

To prevent slippage between pump wheel 9 and the turbine wheel 11, a bridging clutch 27 is positioned between the turbine wheel 11 and the converter housing 3. Bridging clutch 27 includes a plunger disc 29 which is axially slidable on the hub 13 of the turbine wheel and the plunger disc is coupled by a torsional vibration damper 31 with the turbine wheel 11. Plunger disc 29 is sealed relative to the hub 13 by an annular seal 33 and is pressed by the fluid pressure in the converter housing 3 against a friction facing ring 35 at an axial end face 37 of the converter housing 3. Axial end face 37 acts as the clutch countersurface. Due to the increase in fluid pressure on the turbine wheel side of the plunger disc 29, the bridging clutch 27, connected in parallel with the torque transmission path between the pump wheel 9 and the turbine wheel 11, can be engaged and slippage between these two wheels is prevented.

The torsional vibration damper 31 reduces uneven changes in rotational speed which can affect the torque converter on the driven side or on the driving side. Torsional vibration damper 31 includes several helical springs which, in the radially outer region of the plunger disc 29, are distributed over its periphery and are radially guided in U-section guide members 41. Stops 43 on the U-section guide members 41 engage on both sides in front of the end faces of the helical springs and fix these springs in the circumferential direction of the plunger disc 29. The catch ring 45 is attached to the turbine wheel 11 and also engages stops 47 located in front of both end faces of the helical spring 39 so that forces which are transferred by means of the bridging clutch 27 from the converter housing 3 to the helical springs 39 are conducted to the turbine wheel 11. The stops 43 and 47 extend in the axial direction and, as a result, the axial mobility of the plunger disc is assured.

To reduce the vibrational amplitude of the turbine wheel relative to the plunger disc 29 and, when the clutch 27 is engaged, relative to the converter housing 3, a friction damper 49 is connected in parallel to the torsional vibration damper 31. Friction damper 49 reduces operating noises when the bridging clutch 27 is engaged or disengaged and increases the service life of the moving parts of the torque converter.

Friction damper 49 comprises an axially elastic annular disc 51 whose inner periphery is fixed by rivets 53 to the hub 13 of the turbine wheel 11 so that it rotates with the hub. The radially outer region of the annular disc has friction facings or surfaces 55, 57 on both sides. The friction facings 55, 57 are clamped between the plunger disc 29 and an annular cup spring 59 and, in turn, the cup spring is secured to the plunger disc along its inner rim by fastening rivets 61. Fastening rivets 61 extend through oblong holes 63 in the annular disc and these holes extend in the circumferential direction and permit a limited relative rotation of the annular disc 51 with respect to the plunger disc 29. Annular disc 51 has elastic qualities in the axial direction and prestresses the plunger disc in the opening direction of the bridging clutch. At the same time, the initial force of the annular disc 51 defines the excess pressure required of the hydraulic fluid to close the bridging clutch 27. Inside the fastening rivets 61, the annular disc 51 has several openings 65 which increase the axial mobility of the annular disc 51.

The turbine wheel has a blade carrier shell 67 attached to the hub 13 by rivets 53. Turbine blades 69 are secured to the blade carrier shell 67 by projections 71 formed integrally with the turbine blades 69. Projections 71 extend through openings 73 in the blade carrier shell 67 and are caulked or soldered on the side of the blade carrier shell 67 which faces away from the turbine blade 69. In addition, a portion of the projections 71 penetrate the openings 75 in the catch ring 45 and are used for attaching the catch ring 45.

While specific embodiments of the invention have been shown and described in detail to illustrate the application of the inventive principles, it will be understood that the invention may be embodied otherwise without departing from such principles.

We claim:

1. Hydrodynamic torque converter comprising a converter housing, a pump wheel, a turbine wheel and a guide wheel located within said housing, said pump wheel, turbine wheel and guide wheel interact in a fluid cycle and are rotatable relative to one another, said pump wheel and said turbine wheel have a torque transmission path between them, a controllable bridging clutch arranged between said pump wheel and said turbine wheel and disposed in parallel relation to the torque transmission path therebetween, a torsional vibration spring damper located in the torque transmission path of said bridging clutch, wherein the improvement comprises a friction damper connected in parallel to said torsional vibration spring damper, said pump wheel is fixed to said converter housing, said converter housing having an end face forming a clutch countersurface, said bridging clutch includes a clutch disc coaxial with and axially slidable relative to said turbine wheel, said clutch disc is rotatable over a limited angle of rotation relative to said turbine wheel, said clutch disc is positioned between said turbine wheel and said end face of said converter housing, said torsional vibration spring damper includes several springs distributed over the periphery of said clutch disc, stops on said turbine wheel and on said clutch disc projecting toward one another, said springs positioned between said stops, said friction damper includes an axially elastic disc having a radially inner region fixed to said turbine wheel, said radially outer region having friction facings thereon, and said axially elastic disc prestresses said clutch disc and is torsion-resistant in the circumferential direction.

2. Hydrodynamic torque converter, as set forth in claim 1, wherein the radially outer region of said axially elastic disc has said friction facings on the opposite sides thereof, an annular disc is attached to said clutch cisc and clamps said friction facings elastically between said annular disc and said clutch disc.

3. Hydrodynamic torque converter, as set forth in claim 2, wherein said annular disc is a cup spring, fastening elements secure said cup spring to said clutch disc, said fastening elements being distributed in the radially inner region of said cup spring, said axially elastic disc has oblong holes formed therein extending in the circumferential direction and said fastening elements extend through said oblong holes permitting relative rotation between said clutch disc and said turbine wheel.

4. Hydrodynamic torque converter, as set forth in claim 3, wherein said axially elastic disc has openings therethrough radially inwardly of said oblong holes for increasing its elasticity.

5. Hydrodynamic torque converter, as set forth in claim 1, wherein said axially elastic disc prestresses said axially slidable clutch disc away from said end face of said converter housing toward said turbine wheel.

6. Hydrodynamic torque converter, as set forth in claim 1, wherein a catch ring is attached to said turbine wheel, said stops on said turbine wheel project from said catch ring, said turbine wheel includes a blade carrier shell, said turbine blades having projections thereon, said blade carrier shell having openings therethrough, said turbine blades connected to said blade carrier shell by placing said projections through said openings in said blade carrier shell, said catch ring located on the side of said blade carrier shell more remote from said turbine blades, and said catch ring is attached to said blade carrier shell by at least a portion of said projections which extend through openings in said catch ring.

* * * * *